United States Patent
Kinjo

(10) Patent No.: US 6,798,921 B2
(45) Date of Patent: *Sep. 28, 2004

(54) METHOD FOR IMAGE DESIGNATING AND MODIFYING PROCESS

(75) Inventor: Naoto Kinjo, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 65 days.

(21) Appl. No.: 09/268,316

(22) Filed: Mar. 16, 1999

(65) Prior Publication Data
US 2003/0202715 A1 Oct. 30, 2003

(30) Foreign Application Priority Data
Mar. 19, 1998 (JP) .......................... 10-069937

(51) Int. Cl.[7] .............. G06K 9/68; G06K 9/64; H04N 7/14; H04N 5/335
(52) U.S. Cl. .............. 382/282; 382/217; 382/278; 382/284; 382/115; 382/117; 382/118; 382/165; 382/167; 382/170; 348/14.15; 348/317; 348/412.1; 348/526
(58) Field of Search .............. 382/282, 199, 382/197, 164, 302, 303, 217, 218, 219; 345/778, 424; 358/453, 452

(56) References Cited

U.S. PATENT DOCUMENTS

| | | | | |
|---|---|---|---|---|
| 4,768,088 A | * | 8/1988 | Ando .......................... 358/93 |
| 5,644,611 A | * | 7/1997 | McShane et al. ............. 378/98 |
| 5,719,951 A | * | 2/1998 | Shackleton et al. ......... 382/118 |
| 5,732,146 A | * | 3/1998 | Yamada et al. ............. 382/107 |
| 5,740,274 A | * | 4/1998 | Ono et al. ................... 382/190 |
| 5,777,753 A | * | 7/1998 | McShane et al. ........... 358/302 |
| 5,845,018 A | * | 12/1998 | Breish ........................ 382/276 |
| 5,859,921 A | * | 1/1999 | Suzuki ....................... 382/118 |
| 5,995,197 A | * | 11/1999 | Yoshino ..................... 355/41 |
| 6,097,840 A | * | 8/2000 | Shiitani et al. ............. 382/203 |
| 6,097,853 A | * | 8/2000 | Gu et al. .................... 382/282 |
| 6,130,677 A | * | 10/2000 | Kunz ......................... 345/435 |
| 6,160,907 A | * | 12/2000 | Robotham et al. .......... 382/154 |
| 6,278,497 B1 | * | 8/2001 | Sumiyoshi et al. ......... 348/722 |
| 6,297,846 B1 | * | 10/2001 | Edanami ..................... 348/239 |

FOREIGN PATENT DOCUMENTS

| | | |
|---|---|---|
| JP | 54-26729 A | 2/1979 |
| JP | 2-114287 A | 4/1990 |
| JP | 4-346332 A | 12/1992 |
| JP | 8-184925 | 7/1996 |
| JP | 10-200671 | 7/1998 |

* cited by examiner

Primary Examiner—Timothy M. Johnson
Assistant Examiner—Yosef Kassa
(74) Attorney, Agent, or Firm—Sughrue Mion, PLLC

(57) ABSTRACT

Images in a plurality of related images are processed such that a specific region of the image in the first frame is designated and a specific image in the specific region is modified while at the same time the information about the image characteristic quantity of the specific region and what was modified about the specific image are both stored. In the processing of the images in the second and subsequent frames, a similar region that is similar in the image characteristic quantity to the initial specific image is extracted and subjected to the same image modification as has been performed on the specific region of said first frame. Therefore, highly amusing images that have been finished to satisfy the customer's request and other needs can be obtained by simple and efficient operations; as a result, prints of high quality that reproduce such images can be produced in high yield.

18 Claims, 3 Drawing Sheets

METHOD FOR IMAGE DESIGNATING AND MODIFYING PROCESS

BACKGROUND OF INVENTION

This invention relates to the field of image processing technology by which the image data supplied from an image data source such as a film scanner is subjected to specified image processing schemes so as to produce output image data to be supplied to a printer or other output device.

Heretofore, the images recorded on photographic films such as negatives and reversals (which are hereunder referred to simply as "films") have been commonly printed on light-sensitive materials (photographic paper) by means of direct exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a finished print. The printer operating on this principle has been commercialized as a digital photoprinter.

In the digital photoprinter, images can be processed as digital image data to determine the exposing conditions for printing and, hence, not only the assembling of images and the splitting of a single image into plural images but also the compositing of characters can be performed by processing the image data; as a result, prints can be outputted after various editing and/or processing operations have been performed in accordance with specific uses. Outputting images as prints (photographs) is not the sole capability of the digital photoprinter; the image data can be supplied into a computer or the like and stored in recording media such as a floppy disk; hence, the image data can be put to various non-photographic uses.

Having these features, the digital photoprinter is basically composed of the following three parts: a scanner (image reading apparatus) that reads the image on a film photoelectrically; an image processing apparatus (setup apparatus) that processes the captured image and determines the exposing conditions for image recording; and a printer (image recording apparatus) that scan exposes a light-sensitive material in accordance with the determined exposing conditions and performs development and other necessary processing on the exposed light-sensitive material to produce a print.

In the scanner, reading light issuing from a light source is allowed to be incident on a film, from which projected light bearing the image recorded on the film is produced and focused by an imaging lens to form a sharp image on an image sensor such as a CCD sensor; the image is then captured by photoelectric conversion and, after being optionally subjected to various image processing steps, sent to the image processing apparatus as data for the image on the film (as image data signals).

In the image processing apparatus, image processing conditions are set on the basis of the image data captured with the scanner and image processing as determined by the thus set conditions is performed on the captured image data and the resulting output image data for image recording (i.e., exposing conditions) are sent to the printer.

In the printer, if it is of a type that relies upon exposure by scanning with an optical beam, the latter is modulated in accordance with the image data sent from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. Subsequently, development and other processing as determined by the light-sensitive material are performed to produce a print (photograph) reproducing the image that was recorded on the film.

As already mentioned, one big feature of the digital photoprinter is that images can be processed as digital image (i.e., digital processing of image data is possible) to determine the exposing conditions for printing; therefore, by means of the digital photoprinter, various image processing operations steps that have been impossible or difficult to achieve by the conventional direct exposure technique, as exemplified by the correction of washed-out highlights or flat shadows due to the taking of pictures with backlight or an electronic flash, the correction of under- or over-exposure, compensation for the insufficiency of marginal lumination, sharpening and the compression/extension of the density's dynamic range (imparting a dodging effect by image processing), can be performed with great latitude or flexibility to produce prints of very high quality.

In addition, according to digital image processing, the above-mentioned image adjusting (correcting) steps are applied not only to the whole image; if desired, any region of the image, for example, its subject, can be selected and the above-mentioned flexible image adjustments can be performed on the selected area.

SUMMARY OF INVENTION

An object, therefore, of the present invention is to provide an improved digital image processing method that is suitable for use with a digital photoprinter which receives image data from an image data source and which performs specified image processing on the received image data to produce output image data.

A particular object of the invention is to provide an image processing method by which specified image processing can be performed on selected specific regions of the images in a plurality of related frames by a simple procedure and with high efficiency so that high-quality prints that effectively satisfy a customer's request and other needs can be output with high productivity.

The stated object of the invention can be attained by an image processing method for processing images in a plurality of related frames, in which the image data supplied from an image data source is subjected to specified image processing so as to produce output image data, comprising the steps of: in the processing of an image in a first frame among the plurality of related frames, designating a specific region in the first frame; calculating an image characteristic quantity of the specific region; and subjecting the specific region to image modification; storing information about the image characteristic quantity of the specific region and the image modification of specific region; and, further comprising the steps of: in the processing of the images in second and subsequent frames, extracting a similar region that is similar in said image characteristic quantity to the specific region without the image modification in said first frame; and subjecting the similar region to the same image modification as has been performed on the specific region of said first frame.

Preferably, said specific region is at least one member of the group consisting of a human subject taken as a whole, his or her face, hair on the head, eyes, lips, trunk, clothing and accessories.

In another preferred embodiment, said image characteristic quantity is at least one member of the group consisting of position and shape characteristics, density characteristics, color tint characteristics, texture characteristics and space frequency characteristics.

In yet another preferred embodiment, the image characteristic quantity of the specific region before the image modification of said first frame is stored and later used as a criterion for determining as to whether similar regions extracted from the second and subsequent frames need be corrected or not.

The invention further provides an image processing method for processing images in a plurality of related frames and for subjecting image data of the respective images in the plurality of the related frames supplied from an image data source to specific image processing so as to produce output image data of the respective images, comprising:

a step of processing an image in a first frame among the plurality of the related frames, comprising steps of designating manually a specific region having a specific image in the first frame, calculating an image characteristic quantity of the specific image in the specific region and then modifying manually the specific image in the specific region as well as storing information about the image characteristic quantity of the specific region and what was modified about the specific image; and a step of processing of the images in second and subsequent frames, comprising the steps of extracting automatically a similar region that is similar in said image characteristic quantity to the specific region of unmodified specific image in said first frame and subjecting automatically an image in the similar region to the same image modification as has been performed on the specific image in the specific region of the first frame.

DETAILED DESCRIPTION OF INVENTION

The image processing method of the invention is now described in detail with reference to the preferred embodiments shown in the accompanying drawings.

Figure 1:
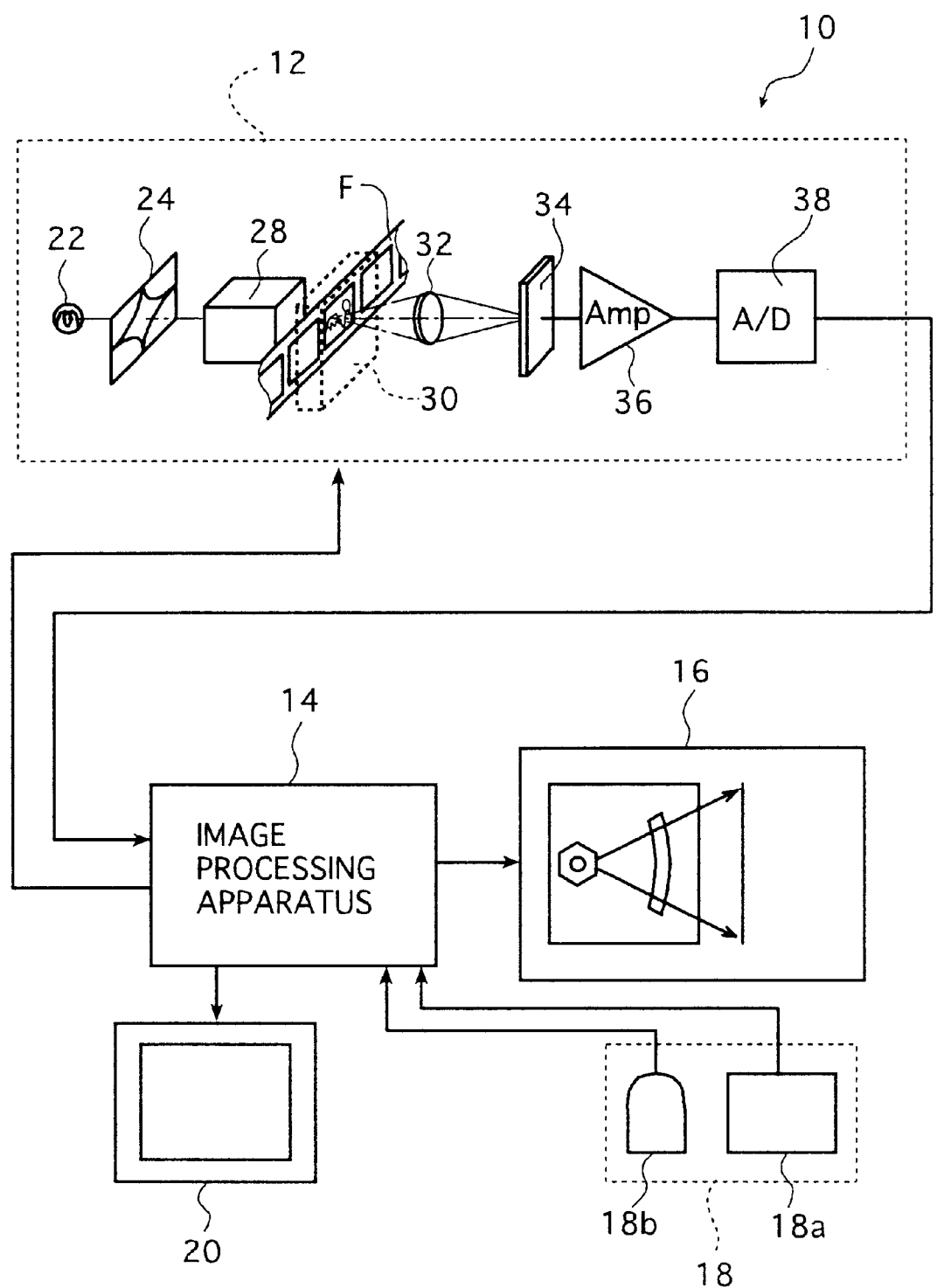
FIG. 1 is a block diagram of a digital photoprinter using an example of the image processing method of the invention.

FIG. 1 is a block diagram of an exemplary digital photoprinter using the image processing method of the invention. The digital photoprinter shown in FIG. 1 (which is hereunder referred to simply as "photoprinter 10") comprises basically a scanner (image reading apparatus) 12 for photoelectrically reading the image recorded on a film F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a display 20 for presenting the image captured with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, an imaging lens unit 32, an image sensor having line CCD sensors capable of reading R (red), G (green) and B (blue) images, an amplifier (Amp) 36 and an A/D (analog/digital) converter 38.

In the photoprinter 10, dedicated carriers are available that can be loaded into the housing of the scanner 12 in accordance with the type of the film used (e.g. whether it is a film of the Advanced Photo System or a negative or reversal film of 135 size), the format of the film (e.g. whether it is a strip or a slide) or other factor. By replacing one carrier with another, the photoprinter 10 can be adapted to process various kinds of films in various modes. The images (frames) that are recorded on the film and which are subjected to the necessary procedure for print production are transported to and held in a specified reading position by means of the carriers.

The scanner 12 captures the images recorded on the film F in the following manner; the reading light from the light source 22 has its quantity adjusted by means of the variable diaphragm 24 and is incident on the film F held in the specified reading position by means of the carrier and thereafter passes through the film F to produce projected light bearing the image recorded on it.

Figure 2A:
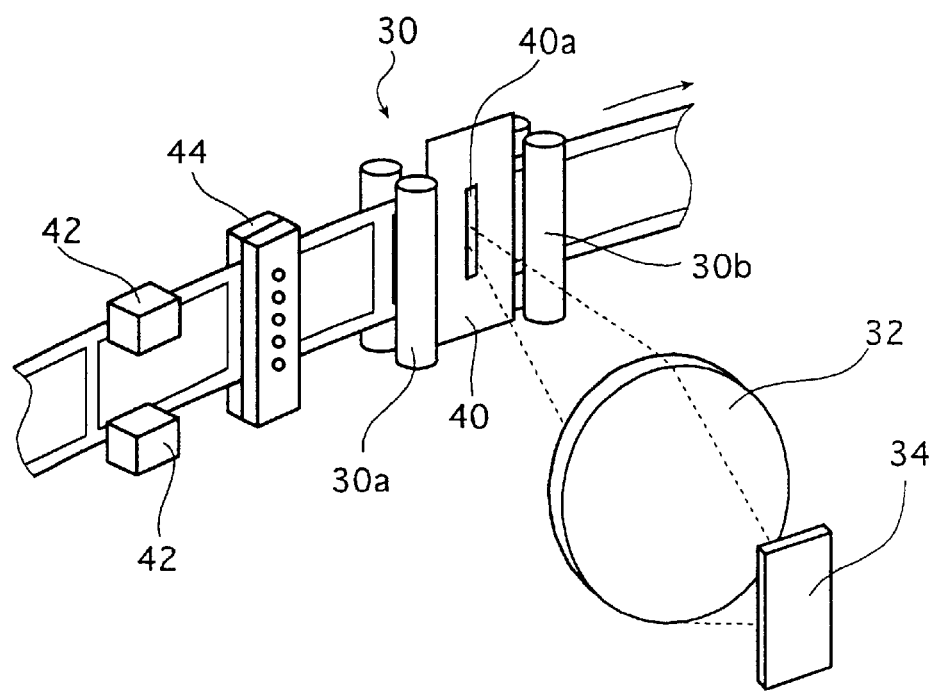
FIG. 2A is a schematic perspective view for illustrating the carrier to be installed in the digital photoprinter shown in FIG. 1.

As shown schematically in FIG. 2A, the illustrated carrier 30 has a pair of transport roller pairs 30a and 30b and a mask 40 having a slit 40a. The transport rollers 30a and 30b are provided on opposite sides of the specified reading position in an auxiliary scanning direction which is perpendicular to the main scanning direction (i.e., the direction in which the line CCD sensors in the image sensor 34 extend) and they transport the film F with its length being parallel to the auxiliary scanning direction as it is in registry with the reading position. The slit 40a defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is captured.

Reference numeral 44 is a code reader for reading various bar codes such as the DX code, expanded DX code and FNS code that are recorded optically on the film.

Magnetic recording media are formed on films of the Advanced Photo System. Carriers adaptive to films of the Advanced Photo System (or their cartridges) are equipped with magnetic heads 42 that read the information recorded on the magnetic recording media and which write necessary information to the media. During image capturing from the film F, the magnetic heads 42 read relevant magnetic information and the necessary information is sent from the scanner 12 to the image processing apparatus 14.

Figure 2B:
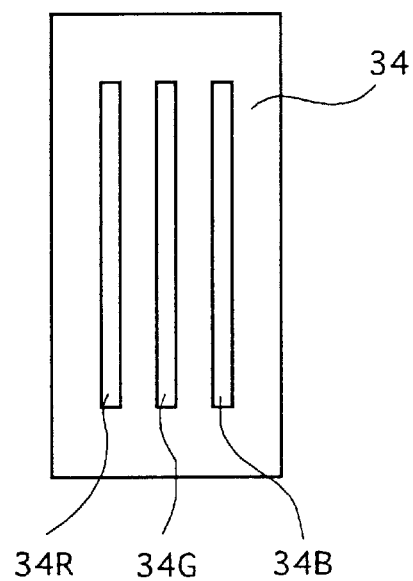
FIG. 2B shows in conceptual form the image sensor in the digital photoprinter shown in FIG. 1.

As already mentioned, the reading light passes through the film F held on the carrier 30 and the resulting image-bearing, projected light is focused by the imaging lens unit 32 to form a sharp image on the light-receiving plane of the image sensor 34. As shown in FIG. 2B, the image sensor 34 is a 3-line color CCD sensor comprising a line CCD sensor 34R for reading R image, a line CCD sensor 34G for reading G image, and a line CCD sensor 34B for reading B image. As already mentioned, the respective line CCD sensors extend in the main scanning direction. The projected light from the film F is separated into three primary colors R, G and B and captured photoelectrically by means of the image sensor 34.

The output signals from the image sensor 34 are amplified with Amp 36, converted to digital from in A/D converter 38 and sent to the image processing apparatus 14.

In the scanner 12, the images recorded on the film F are captured by two scans, the first being prescan at low resolution and the second being fine scan for obtaining output image data. Prescan is performed under preset reading conditions that ensure that the images on all films to be handled by the scanner 12 can be read without saturating the image sensor 34. Fine scan uses the prescanned data and is performed under reading conditions that are set for each frame such that the image sensor 34 is saturated at a slightly lower density than the minimum density of the image (frame) of interest. The output signals for prescan and fine scan are essentially the same data except for resolution and output level.

It should be noted that the scanner to be used in the photoprinter using the image processing method of the invention is by no means limited to a type that relies upon the slit scan technique described above but that it may be of a type that relies upon areal exposure, or a technique by which the image in one frame is scanned across at a time. In this alternative approach, an area CCD sensor may be used with means of inserting R, G and B color filters being provided between the light source and the film F. Image capturing with the area CCD sensor is performed with R, G and B color filters being sequentially inserted to color separate the image recorded on the film.

The image on film F that has been captured with the scanner 12 is not the only source of the image data that can be handled with the photoprinter 10 using the concept of the invention. The photoprinter 10 may receive image data from other sources including a scanner that reads the image on a reflection-type original, an imaging device such as a digital camera or a digital video camera, a computer communication system such as the internet, as well as an image recording medium such as a floppy disk and an MO disk (magneto-optical recording medium), with the received image data being then reproduced on prints.

As already mentioned, the digital signals output from the scanner 12 are fed into the image processing apparatus 14 (which is hereinafter referred to as "processing apparatus 14").

Figure 3:
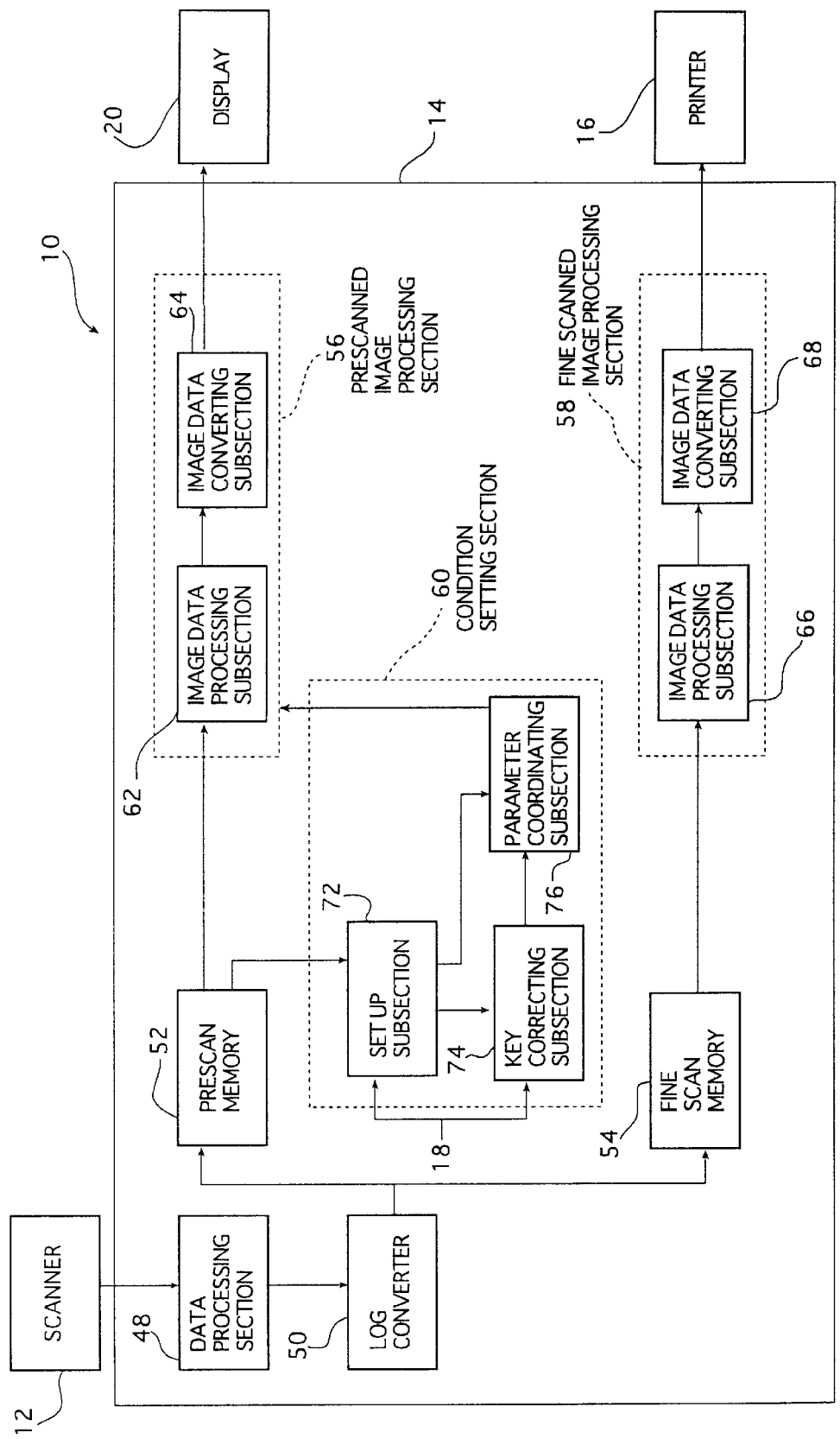
FIG. 3 is a block diagram of the image processing apparatus in the digital photoprinter shown in FIG. 1.

FIG. 3 is a block diagram of the processing apparatus 14, which comprises a data processing section 48, a log converter 50, a prescan (frame) memory 52, a fine scan (frame) memory 54, a prescanned image processing section 56, a fine scanned image processing section 58, and a condition setting section 60.

FIG. 3 shows only the parts related to image processing and besides these parts, the processing apparatus 14 includes a CPU for controlling and managing the overall operation of the photoprinter 10 including the processing apparatus 14, memories for storing the information necessary for the operation and otherwise of the photoprinter 10. The manipulating unit 18 and the display 20 are connected to related parts via the CPU and the like (CPU bus).

The R, G, and B digital signals output from the scanner 12 are sent to the data processing section 48, where they are subjected to specified data processing steps such as dark correction, defective image correction and shading correction. Thereafter, the processed digital signals are transferred into the log converter 50, where they are converted to digital form (density data), of which prescanned data is stored in the prescan memory 52 and fine scanned data is stored in the fine scan memory 54.

The prescanned data stored in the prescan memory 52 is read into the prescanned image processing section 56 having an image data processing subsection 62 (hereinafter referred to as "processing subsection 62") and an image data converting subsection 64 whereas the fine scanned data stored in the fine scan memory 54 is read into the fine scanned image processing section 58 having an image data processing subsection 66 (hereinafter referred to as "processing subsection 66") and an image data converting subsection 68.

The processing subsection 62 in the prescanned image processing section 56 and the processing subsection 66 in the fine scanned image processing section 58 are the sites where the image (image data) captured with the scanner 12 is subjected to specified image processing steps in accordance with the conditions that are set by means of the condition setting section 60 to be described later in this specification. The two processing subsections 62 and 66 perform basically the same processing except for resolution.

The image processing steps to be performed by the processing subsections 62 and 66 are not limited to any particular types and may be exemplified by various known image processing steps in the art. Examples include gray balance adjustment, tonal correction and density (lightness) adjustment that are performed using LUTs (look-up tables), as well as correction for the kind of light source used in taking the picture and the saturation adjustment (color adjustment) of the image that are performed by matrix (MTX) operations. Other examples are electronic scaling, dodging (compressing/extending the density's dynamic range) and sharpening; these steps are performed using a low-pass filter, an adder, LUTs, MTXs and so forth, or by averaging, interpolation and other means that use appropriate combinations of those devices.

The conditions for the above-mentioned image processing steps are set in the condition setting section 60 (to be described below) using the prescanned data.

The image data converting subsection 68 is a site where the image data processed by the processing subsection 66 is converted with a 3D (three-dimensional) LUT or the like into image data that is subsequently supplied into the printer 16 as image data corresponding to image recording with the printer 16.

The image data converting subsection 64 optionally reduces unwanted features of the image data processed by the processing subsection 62 and similarly converts the image data with a 3D-LUT or the like into image data that corresponds to the presentation on the display 20 and which is subsequently supplied to the display 20.

The conditions for the processing to be done in the two image data converting subsections 64 and 68 are set in the condition setting section 60 (which is described below) using the prescanned data.

The condition setting section 60 sets the conditions for the various image processing steps to be done in the prescanned image processing section 56 and the fine scanned image processing section 58. It also sets the reading conditions for fine scan. The condition setting section 60 comprises a setup subsection 72, a key correcting subsection 74 and a parameter coordinating subsection 76.

The setup subsection 72 reads out the prescanned data from the prescan memory 52 and, on the basis of the acquired prescanned data, constructs density histograms and calculates image characteristic quantities such as average density, highlights (minimal density) and shadows (maximal density) to determine the reading conditions for fine scan; in addition, the setup subsection 72 constructs LUTs for performing gray balance adjustment, tonal correction and density adjustment, constructs MTX operational formulae for performing saturation correction, calculates coefficients for sharpness correction and otherwise sets (calculates) conditions for the various image processing schemes to be implemented in the prescanned image processing section 56 and the fine scanned image processing section 58 and supplies them to the parameter coordinating subsection 76.

The key correcting subsection 74 calculates the amounts of adjustment of image processing conditions typically in accordance with various commands entered by means of keys for adjusting the density (brightness), color, contrast, sharpness, saturation and so forth that have been set in the keyboard 18*a* or by the mouse 18*b*; the key correcting subsection 74 then supplies the calculated amounts of adjustment into the parameter coordinating subsection 76.

After receiving the image processing conditions that have been set by the setup subsection 72, the parameter coordinating subsection 76 sets them in the prescanned image processing section 56 and the fine scanned image processing section 58. Further, in accordance with the amounts of adjustment calculated by the key correcting subsection 74, the parameter coordinating subsection 76 either corrects (adjusts) the image processing conditions set in various parts or makes another setting of image processing conditions.

Suppose here that when implementing the image processing method of the invention, the photoprinter 10 produces prints by processing the images in a plurality of related frames as exemplified by all or a part of frames of a roll of film, a plurality of films which were simultaneously received from one customer who wanted them to be processed for print production, and films in general that were manufactured at the request of a specific customer. Also suppose that for a certain reason such as the need to satisfy the request of a customer (the person who made a request for print production), the operator designated a specific region of an image, for example, a specific image such as a specific subject and a principal subject for the previously processed frame and adjusted the image in that region. In this case, a region similar to the designated specific region is extracted from subsequent frames in the condition setting section 60 of the photoprinter 10 and the image in that region is similarly adjusted.

Another example of the "related frames" are those set by the criterion of "a certain locality in general". It is often required that the settings of printers being shipped from the factory should be adjusted to become suitable for the geographic area where they are going to operate, in such aspects as the method of finishing the skin color of persons of a different race or the general preference by people in that area. The setting with reference to "a certain locality in general" is suitable for this particular situation.

For convenience sake, the following explanation assumes that a specific region (or a specific image in the specific region) is designated and adjusted in the first frame. However, this is not the sole case of the invention and, depending on the instruction given by the customer, the subject in the image and other factors, the necessary operations may be performed on the second and subsequent frames. Alternatively, the operator may designate which frames should be handled by the image processing method of the invention and then designate and adjust a specific region (or a specific image) in the first of those frames.

In the assumed case of processing the first frame of the film F, the operator may indicate that the specific region (the specific image, that is, the picture to be adjusted) is a face; then looking at the image presented on the display 20 (e.g. the simulated image for verification), the operator uses the mouse 18*b* and the like to select a region containing the face of a specific person or persons in the image of the frame; further, in accordance with the progress of the processing in the condition setting section 60 (i.e., at the end of face extraction), the operator manipulates the keyboard 18*a* to perform color and density adjustments. The color/density adjustments of the face are preferably performed in accordance with how the customer wants his or her face to be finished in the print (i.e., his or her instruction on the state of print finish), for example, should it be suntanned, fair-complexioned or of healthy complexion.

The information about the above-described steps of designating and adjusting the face region is supplied to the condition setting section 60. In the condition setting section 60, the setup subsection 72 constructs density histograms and the like for the region selected by the operator and uses them to extract the face region typically from the color/density data. It should be noted that instead of selecting a region, he or she may designate a point in the face (specific region) with the mouse 18 and the like and extract the face on the basis of the continuity of the color/density data.

The setup subsection 72 then calculates the image characteristic quantities of the extracted face region and store them. Various known image characteristic quantities may be calculated and they include: color/density characteristics such as density histogram, highlight, shadow, average density, color range and density range; position and shape characteristics such as size, aspect ratio, circularity and position range; texture characteristics; and space frequency characteristics. In the illustrated case, a density range ($d1_a$–$d2_a$) and color ranges ($R1_a$–$R2_a$, $G1_a$–$G2_a$, $B1_a$–$B2_a$) are preferably used.

In a separate step, the face region which is the specific region extracted by the setup subsection 72 and the command for adjusting the specific region are sent to the key correcting subsection 74. In accordance with the command for adjustment, the key correcting subsection 74 calculates the amounts of adjustment of the image processing conditions and supplies them to the parameter coordinating subsection 76. At the same time, the key correcting subsection 74 calculates the amounts of color/density adjustments in response to the command for adjustment and sends them to the setup subsection 72.

On the basis of the supplied amounts of color/density adjustments, the setup subsection 72 calculates the density range ($d1_b$–$d2_b$) and color ranges ($R1_b$–$R2_b$, $G1_b$–$G2_b$, $B1_b$–$B2_b$) for the adjusted face region and store these ranges.

Note that in the parameter coordinating subsection 76, the image processing conditions set in various parts or sites of the system are adjusted in accordance with the amounts of adjustment of the image processing conditions that have been calculated by the key correcting subsection 74.

For the second and subsequent frames, the condition setting section 60 extracts a similar region to the specific region (or the specific image in the specific region) designated in the first frame (i.e., in the case under consideration, it extracts the face region of the image) and sets image processing conditions such that the extracted face region will be finished in the same way as the face designated as a specific region in the first frame. For example, image processing conditions are set in such a way that they will give the previously stored density range ($d1_b$–$d2_b$) and color ranges ($R1_b$–$R2_b$, $G1_b$–$G2_b$, $B1_b$–$B2_b$) for the adjusted face region in the first frame.

Thus, according to the present invention, images that have been finished to satisfy the customer's request and other needs can be obtained by simple operation and with satisfactory efficiency; as a result, highly amusing prints of high quality that satisfy the customer's request and other needs can be produced in high yield.

The method of face extraction is not limited in any particular way and two examples are as follows: in one approach, a region that presumably represents the skin of a human subject is extracted on the basis of the color/density data of the image (or pixels) and their continuity; the other approach uses the method of extracting images subjects that is disclosed in Unexamined Published Japanese Patent Application (kokai) No. 184925/1996, according to which the image is binarized with reference to a threshold and divided into a plurality of high-density regions and a plurality of low-density regions and each region is extracted; then, the contour of each region is extracted and later used to extract the hair on the head, trunk, internal structure of the face (eyes, nose, mouth, lips, ears), background and so forth.

Other methods that can be employed are the various techniques of extracting image subjects, as disclosed in Unexamined Published Japanese Patent Application (kokai) Nos. 346332/1992, 346333/1992, 346334/1992, 100328/1993, 158164/1993, 165119/1993, 165120/1993, 67320/1994, 160992/1994, 160993/1994, 160994/1994, 160995/1994, 122944/1996, 80652/1997, 101579/1997, 138470/1997 and 138471/1997.

If desired, the image characteristic quantities of the specific region (or specific image) in the first frame before image adjustment, namely, the density range ($d1_a$–$d2_a$) and color ranges ($R1_a$–$R2_a$, $G1_a$–$G2_a$, $B1_a$–$B2_a$) for the face designated as the specific region in the illustrated case, may be used to extract a similar color/density region (skin color region), thereby effecting face extraction. Alternatively, such image characteristic quantities may be used as auxiliary information for face extraction by one of the aforementioned methods of extracting image subjects.

Image adjustments by the above-described image processing method of the invention are in no way limited to the face of a human subject and may be applied to other image subjects. For example, women have diverse preference for their hair and some may prefer suave brown hair while others prefer raven (glossy black) hair and the photoprinter desirably has the ability to make adjustments in accordance with a specific preference.

As in the case of face adjustment, the hair on the head as a specific region may be adjusted by the following procedure: when processing the first frame of the film F, image processing conditions are determined from the prescanned data and set at a specified site in the prescanned image processing section 56 and the fine scanned image processing section 58; at the same time, looking at the image presented on the display 20, the operator indicates that the specific region is the hair on the head and uses the mouse 18b or the like to select the hair on the head of a human subject that has been designated as the specific region; subsequently, the operator manipulates the keyboard 18a to make color and density adjustments in accordance with the customer's request, with the information about the adjustments being supplied to the condition setting section 60.

In the condition setting section 60, the setup subsection 72 extracts the hair on the head from the operator-selected region, calculates the image characteristic quantities of the extracted hair on the head and stores them. In a separate step, the key correcting subsection 74 calculates the amounts of adjustment of image processing conditions in accordance with the command for color and density adjustments and supplies them to the parameter coordinating subsection 76, followed by the adjustment of the image processing conditions. At the same time, the key correcting subsection 74 calculates the amounts of color/density adjustments in response to the command for adjustment and sends them to the setup subsection 72. On the basis of the supplied amounts of color/density adjustments, the setup subsection 72 calculates the image characteristic quantities of the adjusted hair on the head and stores them.

For the second and subsequent frames, the condition setting section 60 extracts a similar region to the specific region designated in the first frame, namely, the hair on the head of the person that has been designated as the specific region, and sets image processing conditions, for example, the previously employed image processing conditions such that the extracted hair on the head will be finished in the same way as the hair on the head designated in the first frame.

For extracting the hair on the head, one may first extract the face by the same method as described above in connection with the case where the face is designated as a specific region; then, the image characteristic quantities of the hair on the head in the first frame that has been designated as the specific region are used to extract a region around the face that corresponds to the hair on the head. Alternatively, the method of hair extraction disclosed in Unexamined Published Japanese Patent Application (kokai) No. 184925/1996, supra, may be employed. If desired, the image characteristic quantities of the hair on the head in the first frame may solely be used to extract the hair on the head as a similar region.

In addition to the face and the hair on the head, various other pictures may be designated as the specific region and subjected to image adjustment in the same manner as described above and preferred examples of such pictures include eyes (their pupils), nose, mouth (lips), ears, trunk (arms, neck and other skin portions), clothing (to be adjusted as regards its shape or pattern) and accessories (e.g. eyeglasses, earrings and necklace).

It should be noted here that the human subject recorded in a photographic scene is not necessarily a single person who appears in all frames; it often occurs that both a fair-complexioned person and a dark-skinned person appear in one scene or, alternatively, entirely different persons are recorded in successive frames. In principle, all human faces are extracted. If, in addition to the human face, hair on the head and other subjects that have been designated as a specific region in the first frame, those which have not been designated as such are finished to the same, uniform quality, the result may often turn out to be unfavorable.

To deal with this situation, the present invention may be adapted such that the image characteristic quantities of a specific region before processing of the first frame are used as criteria for evaluating the similarity of the face or the hair on the head that are extracted as a similar region from the second and subsequent frames, thereby determining as to whether the extracted specific region is the appropriately similar region or not, namely, if that region should be adjusted for color/density and the like.

If desired, the density distribution over the image taken as a whole may be used as a criterion for determining as to whether or not the scene of interest was taken with rear light and another determination is made as to whether the face extracted as a similar region has the average face density for scenes taken with rear light or corresponds to the face of a dark-skinned person; the result of the second determination may be used as a criterion for determining the necessity for subsequent adjustments.

An alternative approach is as follows: the density and color distributions around the specific region in the first frame are stored; after face extraction in the second and subsequent frames, the density and color distributions around the extracted face are observed and compared with the stored data to determine as to whether the result of extraction of the similar region is appropriate or not. If the specific region to be extracted is the hair on the head, its texture characteristics can also be used and they are even effective depending on hair style.

According to another method, the eyes as a specific region are detected in the first frame; then, in the second and subsequent frames, face extraction is followed by the detection of the eyes and their color, positions (the distance between the two eyes) and other data may be used as criteria for determining as to whether the result of extraction of the similar region is appropriate or not. An exemplary method of detecting the eyes is disclosed in Unexamined Published Japanese Patent Application (kokai) No. 184925/1996, supra.

In yet another applicable method, face extraction and trunk extraction are performed and the first frame is compared with the second and subsequent frames in various aspects including color/density, the pattern in clothing or the like, and the presence or absence of accessories such as eyeglasses and earrings of specific shapes, colors and densities in specific areas, those aspects being used as criteria for determining as to whether the result of extraction of the similar region is appropriate or not. This method is effective in the case where all frames were taken on the same day, particularly at short intervals.

In the examples described above, the person designated as the specific region is only subjected to color and density adjustments. However, this is not the sole case of the invention and various other adjustments may be performed. In one example, a particular person is designated as the specific region and only that region (which may be a part such as the face or trunk of the person) is subjected to an adjustment of the ratio of magnification by image processing (i.e., electronic magnification ratio) such that the person on the print appears to be of a more slender or sturdy build than he or she actually is.

Alternatively, sharpening, blurring or other suitable technique may be employed to process a particular person such that his or her eyes are highlighted or his or her overall or facial expression gives a soft impression.

If desired, various special processing steps may be applied, as exemplified by putting light into the eyes, compositing a pattern of a specific shape and processing the image to have pictorial quality.

It should also be noted that the concept of the invention is suitably applicable to non-human subjects. If a recorded scene includes a mountain, the shape of its ridgeline, density, color tint, texture and other image characteristic quantities may be used to ensure that the same image adjustments as those performed on the mountain designated as the specific region in the first frame are applicable to the second and subsequent frames. This is also true with other pictures such as flowers, still life subjects and the sky as a landscape and their density, color tint, texture and other image characteristic quantities may be used to perform the same adjustments as described above.

In the foregoing description, the operator manipulates the keyboard 18a and the like to perform image adjustments on a specific region in the first frame and, in the second and subsequent frames, the same image adjustments as those performed on the first frame by the operator are applied to an image similar to the specific image. However, this is not the sole case of the invention and the following alternative approach may be taken: instructions for various finishing modes and image processing conditions suitable for those instructions are preliminarily set; if a specific region is designated in the first frame and an instruction for finishing that specific region is issued, followed by the associated image processing, a similar image is extracted from the second and subsequent frames in the manner already described above and subjected to the image processing associated with the instruction for the same finishing mode.

Various finishing modes may be instructed and they include: fair complexion, slender build, eliminating red eyes, construction photograph, portrait, memorial photograph, group photograph, sports, night view, portrait in night view, silhouette, the setting sun, snow, green, cloth filter, spring, summer, autumn, winter, early summer, Christmas, New Year's Day, birthday, baby, wedding ceremony, flower, suntanned skin, blond hair, brown hair, Negro, Caucasian, black-and-white, sepia, soft focus, soft gradation, posterize and an image of pictorial quality. These and other finishing modes are preferably formatted in ID code.

If "slender build" is instructed as a finishing mode, an exemplary image processing condition is to use an aspect ratio of 1:0.95 in magnifying the specific image and a similar image only (the following description assumes that a specific finishing mode is only applied to those images).

If "fair complexion" is instructed as a finishing mode, an exemplary image processing condition is to lower the face density by 0.1 in terms of density D (adjust for −0.1).

If "Negro" or "Caucasian" is instructed as a finishing scheme, exemplary image processing conditions are the image data for the skin of the ideal color or details, as well as LUTs that enable the skin of the image subject to become closer to the ideal condition and the information for their construction. Similarly, if "blond hair" or "brown hair" is instructed as a finishing mode, exemplary image processing conditions are the image data for the ideal hair on the head, as well as LUTs that enable the hair on the head of the subject to become closer to the ideal condition and the information for their construction.

For details about the instructions for specific finishing modes and the associated image processing steps, see the specification of the commonly assigned Japanese Patent Application No. 268724/1998.

The image processing method of the invention also encompasses the case where the above-described information about a specific region, its image characteristic quantities and the associated image adjustments is formatted in database together with the ID data of a particular customer; if the customer makes a request for print preparation, the operator may extract a similar region and perform the same image adjustments as have been applied to the specific region.

We now describe the image processing method of the invention in greater detail by explaining the operations of the scanner 12 and the processing apparatus 14.

At the request of a customer, the operator loads the scanner 12 with a carrier 30 that is associated with the film F, sets the film F (or its cartridge to be more exact) in a specified position on the carrier 30, enters the necessary information such as the size of the prints to be prepared, and thereafter keys in a command for starting print preparation.

In response to the START command, the stop-down value of the variable diaphragm 24 in the scanner 12 and the storage time of the image sensor (line CCD sensors) 34 are set in accordance with the reading conditions for prescan; thereafter, the carrier 30 transports the film F in the auxiliary scanning direction at a suitable speed to start prescan; as already mentioned, the film F is subjected to slit scan in the specified reading position and the projected light is focused on the image sensor 34 so that the image recorded on the film F is captured photoelectrically as R, G and B separations.

During the transport of the film F, the magnetic information recorded in the magnetic recording media are read and bar codes such as DX code are read with the code reader 44, whereupon the necessary information is sent to a specified site.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The output signals produced from the image sensor 34 by prescan are amplified by Amp 36 and sent to the A/D converter 38, where they are converted to digital form. The digital signals are sent to the processing apparatus 14, where they are given specified data processing steps in the data processing section 48 and converted to prescanned data (digital image data) in the log converter 50, with the prescanned data being then stored in the prescan memory 52.

The setup subsection 72 in the condition setting section 60 reads the stored prescanned data out of the prescan memory 52, constructs density histograms of the image, calculates image characteristic quantities such as highlights and shadows and performs any other necessary operations to set the reading conditions for fine scan, which are then supplied to the scanner 12. Using the constructed density histograms and the calculated image characteristic quantities and in response to commands optionally entered by the operator, the setup subsection 72 sets the image processing conditions and sends them to the parameter coordinating subsection 76.

Upon receiving the image processing conditions, the parameter coordinating subsection 76 sets them at a specified site (hardware) in the prescanned image processing section 56 and the fine scanned image processing section 58.

If verification is to be performed, the processing subsection 62 reads the prescanned data from the prescan memory 52, processes it and subsequently converts the processed data to a suitable form in the image data converting subsection 64. The converted data is presented as a simulated image on the display 20.

Looking at the presentation on the display 20, the operator checks (verifies) the image, or the result of the processing and, if necessary, manipulates the aforementioned keys on the keyboard 18a or the mouse 18b to adjust the color, density, gradation and other features of the overall image.

Assume here that the image processing method of the invention is implemented. Prior to overall image adjustments, the operator, in order to meet the customer's request or other needs, designates a specific region to be processed (which in the assumed case is the face of a human subject); the operator then uses the mouse 18b or the like to select a region including the specific region (the human face) and, at the end of face extraction in the condition setting section 60, adjusts the selected region in certain aspects, for example, color and density.

The information about the selected region is sent to the setup subsection 72 which, in turn, extracts the face region on the basis of the color/density data, calculates its image characteristic quantities (e.g., the aforementioned density and color ranges) and stores them.

The information about the face region (i.e., the specific region extracted with the setup subsection 72), the input for the adjustments of the color/density of the face region, and the input for overall image adjustments are sent to the key correcting subsection 74 which, in response to the entered inputs for adjustment, calculates the amounts of correction of the image processing conditions and sends them to the parameter coordinating subsection 76. In response to the supplied amounts of correction, the parameter coordinating subsection 76 corrects the LUTs, MTXs and other conditions in the processing sections 62 and 66 as already described above. The image presented on the display 20 also varies in response to this corrective measure, or the inputs for adjustment entered by the operator.

If the operator concludes that the image in the frame of interest presented on the display is appropriate (verification OK), he or she manipulates the keyboard 18a or the mouse 18b to give a command for print start, whereupon the image processing conditions are finalized and set in the scanner 12 in accordance with the reading conditions for fine scan including the stop-down value of the variable diaphragm 24 and, at the same time, carrier 30 transports the film F at a suitable speed, whereby fine scan gets started.

When the image processing conditions are finalized, the key correcting subsection 74 calculates the amounts of operator adjustments of the color/density of the face region designated as the specific region and sends them to the setup subsection 72. In response to the supplied amounts of adjustments, the setup subsection 72 calculates the image characteristic quantities of the specific region after image adjustment, and stores them.

If neither the verification nor the image processing method of the invention is to be performed, the image processing conditions are finalized at the point of time when the parameter coordinating subsection 76 has set the image processing conditions in the fine scanned image processing section 58, whereupon fine scan gets started.

Fine scan is performed in essentially the same manner as prescan except that the reading conditions are those for fine scan including the stop-down value of the variable diaphragm 24; the output signals from the image sensor 34 are amplified with Amp 36, converted to digital form in the A/D converter 38, processed by the data processing section 48 in the processing apparatus 14, converted to fine scanned data in the log converter 50 and sent to the fine scan memory 54.

The fine scanned data being sent to the fine scan memory 54 is read by means of the fine scanned image processing section 58, processed under the image processing conditions finalized in the processing subsection 66 and subsequently converted to output image data in the image data converting subsection 68 before it is sent to the printer 16.

Subsequently, when the reading of the first frame ends, prescan of the second frame starts in the same manner as described above. After the prescanned data is stored in the prescan memory 52, the setup subsection 72 in the condition setting section 60 reads the data out of the prescan memory 52, constructs density histograms, calculates the image characteristic quantities and performs any other necessary operations; on the basis of the results of these steps, the setup subsection 72 sets the reading conditions for fine scan and its also sets the associated image processing conditions.

Assume here that the image processing method of the invention is implemented. Prior to setting the image processing conditions, the condition setting section 60 performs face extraction from the image in the second frame. If the face similar to the face previously designated as the specific region is extracted, the condition setting section 60 sets the image processing conditions such that the image characteristic quantities of the extracted face as the similar region agree with the already stored image characteristic quantities of the face as the adjusted specific region in the first frame.

Subsequently, verification is performed in the same manner as described above using the simulated image based on the prescanned data. If the result of the verification is found OK, a command for print START is issued, whereupon the image processing conditions are finalized. Then, fine scan is performed and the fine scanned data is processed under the finalized image processing conditions and output to the printer 16. Image reading from the third and subsequent frames is performed in the same manner.

The printer 16 is the combination of a printer (exposing device) that records a latent image on a light-sensitive material (photographic paper) by exposing it in accordance with the supplied image data and a processor (developing device) that performs specified processing steps on the exposed light-sensitive material and which outputs it as a print. To give one example of the printer's operation, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data outputted from the processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with said light beams. The latent image bearing light-sensitive material is then supplied to the processor. Receiving the light-sensitive material, the processor performs a wet development process comprising color development, bleach-fixing and rinsing; the thus processed light-sensitive material is dried to produce a print; a plurality of prints thus produced are sorted and stacked in specified units, say, one roll of film.

While the image processing method of the invention has been described above in detail, it should be understood that the invention is by no means limited to the aforementioned example and that various improvements and modifications are possible without departing from the scope and spirit of the invention.

As described above in detail, the concept of the present invention is primarily intended to be applied to photoprinters, both analog and digital, and highly amusing images that have been finished to satisfy the customer's request and other needs can be obtained by simple and efficient operations; as a result, prints of high quality that reproduce such images can be produced in high yield.

What is claimed is:

1. An image processing method for processing images in a plurality of related frames, in which the image data supplied from an image data source is subjected to specified image processing so as to produce output image data, comprising the steps of: in the processing of an image in a first frame among the plurality of related frames, designating a specific region in the first frame; calculating an image characteristic quantity of the specific region; subjecting the specific region to image modification; and storing the image characteristic quantity of the specific region and the image modification of specific region; and, further comprising the steps of: in the processing of the images in second and subsequent frames, extracting a similar region that is similar in said image characteristic quantity to the specific region without the image modification in said first frame; and subjecting the similar region to the same image modification performed on the specific region of said first frame.

2. The image processing method according to claim 1, wherein said specific region is at least one member of the group consisting of a human subject taken as a whole, his or her face, hair on the head, eyes, lips, trunk, clothing and accessories.

3. The image processing method according to claim 1, wherein said image characteristic quantity is at least one member of the group consisting of position and shape characteristics, density characteristics, color tint characteristics, texture characteristics, and space frequency characteristics.

4. The image processing method according to claim 1, wherein the image characteristic quantity of the specific region before the image modification of said first frame is stored and later used as a criterion for determining as to whether similar regions extracted from the second and subsequent frames need be corrected or not.

5. The method of claim 1, wherein said image modification comprises at least one of color adjustment, contrast adjustment, density adjustment and shading adjustment.

6. The method of claim 5, wherein the plurality of related frames comprise frames of a photographic film.

7. The method of claim 1, wherein the plurality of related frames comprise frames of a photographic film.

8. The method of claim 1, wherein the plurality of related frames comprise frames related by a common geographic area.

9. The image processing method according to claim 1, wherein said image characteristic quantity is at least one member of the group consisting essentially of density characteristics, color tint characteristics, texture characteristics and space frequency characteristics.

10. The image processing method according to claim 1, wherein the specific region designated in the first frame includes at least one of substantially continuous color and density data.

11. The image processing method according to claim 1, wherein the similar region is extracted from any location within the second and subsequent frames.

12. An image processing method for processing images in a plurality of related frames and for subjecting image data of the respective images in the plurality of the related frames supplied from an image data source to specific image processing so as to produce output image data of the respective images, comprising:

a step of processing an image in a first frame among the plurality of the related frames, comprising steps of designating manually a specific region having a specific image in the first frame, calculating an image characteristic quantity of the specific image in the specific region, modifying manually the specific image in the specific region, and storing the image characteristic quantity of the specific region and the image modification of the specific image; and a step of processing of the images in second and subsequent frames, comprising the steps of extracting a similar region that is similar in said image characteristic quantity to the specific region of unmodified specific image in said first frame and subjecting an image in the similar region to the same image modification performed on the specific image in the specific region of the first frame.

13. The image processing method according to claim 12, wherein said specific image in said specific region is at least one member of the group consisting of a human subject taken as a whole, face, hair on the head, eyes, lips, trunk, clothing and accessories.

14. The image processing method according to claim 12, wherein said image characteristic quantity is at least one member of the group consisting of position and shape characteristics, density characteristics, color tint characteristics, texture characteristics and space frequency characteristics.

15. The image processing method according to claim 12, wherein the image characteristic quantity of the specific image in the specific region before image modification of the specific image in said first frame is stored and later used as a criterion for determining as to whether similar regions extracted from the second and subsequent frames need be corrected or not.

16. An image processing method according to claim 1, wherein said processing of the image in the first frame further comprises producing an output image of the first frame with the modified specific region, and said processing of the images in the second and subsequent frames further comprises producing output images of the second and subsequent frames with a modified similar region.

17. An image processing method according to claim 12, wherein said step of processing the image in the first frame further comprises producing an output image of the first frame with the modified specific image in the specific region, and said step of processing of the images in the second and subsequent frames further comprises producing output images of the second and subsequent frames having a modified image in the similar region.

18. An image processing method according to claim 12, wherein said step of extracting the similar region is performed automatically, and said step of subjecting the image in the similar region is performed automatically.

* * * * *